United States Patent
Bartrug et al.

(10) Patent No.: US 6,791,065 B2
(45) Date of Patent: Sep. 14, 2004

(54) EDGE SEALING OF A LAMINATED TRANSPARENCY

(75) Inventors: Bruce A. Bartrug, Lower Burrell, PA (US); Allen R. Hawk, Pittsburgh, PA (US); Robert N. Pinchok, New Kensington, PA (US); James H. Schwartz, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/201,863

(22) Filed: Jul. 24, 2002

(65) Prior Publication Data

US 2004/0016738 A1 Jan. 29, 2004

(51) Int. Cl.$^7$ ................................................ B60L 1/02

(52) U.S. Cl. ...................................... 219/203; 219/541

(58) Field of Search ................................ 219/203, 522, 219/219, 541; 318/22 R, 309, 312, 314

(56) References Cited

U.S. PATENT DOCUMENTS

| | | | | |
|---|---|---|---|---|
| 3,616,122 A | * | 10/1971 | Orcutt ........................ 428/38 |
| 3,781,524 A | * | 12/1973 | Levin ......................... 219/522 |
| 3,789,191 A | | 1/1974 | Spindler ..................... 338/24 |
| 3,789,192 A | | 1/1974 | Spindler ..................... 219/522 |
| 3,790,752 A | | 2/1974 | Boaz et al. ................. 219/522 |
| 3,794,809 A | | 2/1974 | Beck et al. ................. 219/203 |
| 4,100,398 A | * | 7/1978 | Levin ......................... 219/541 |
| 4,323,726 A | * | 4/1982 | Criss et al. ................. 174/257 |
| 4,401,609 A | | 8/1983 | McGarry et al. ............ 264/11 |
| 4,543,466 A | * | 9/1985 | Ramus ....................... 219/203 |
| 4,587,769 A | | 5/1986 | Cathers .................... 51/165.87 |
| 4,593,175 A | * | 6/1986 | Bowser et al. ............. 219/203 |
| 4,654,067 A | | 3/1987 | Ramus et al. .............. 65/60.5 |
| 4,707,591 A | * | 11/1987 | Sprenger ................... 219/541 |
| 4,718,932 A | | 1/1988 | Pharms ....................... 65/42 |
| 4,820,902 A | | 4/1989 | Gillery ...................... 219/203 |
| 4,998,784 A | | 3/1991 | Freeman et al. ............ 350/3.7 |
| 5,015,824 A | * | 5/1991 | Monter et al. .............. 219/219 |
| 5,030,592 A | | 7/1991 | Komarneni et al. .......... 501/9 |
| 5,040,411 A | | 8/1991 | Medzius ....................... 73/73 |
| 5,066,111 A | | 11/1991 | Singleton et al. .......... 359/275 |
| 5,070,230 A | * | 12/1991 | Osada et al. ............... 219/203 |

(List continued on next page.)

FOREIGN PATENT DOCUMENTS

| | | |
|---|---|---|
| EP | 00/73062 | 12/2000 |
| WO | 00/76930 | 12/2000 |

OTHER PUBLICATIONS

U.S. patent application Ser. No. 09/738,306 filed Dec. 15, 2000.

U.S. patent application Ser. No. 09/591,572 filed Jun. 9, 2000.

PCT patent application Ser. No. US02/06163 filed Feb. 28, 2002.

*Primary Examiner*—Sang Paik
*Assistant Examiner*—Leonid Fastovsky
(74) *Attorney, Agent, or Firm*—Andrew G. Siminerio (57) ABSTRACT

A heatable laminate includes a first substrate; an electrically conductive member on a portion of the first substrate; a pair of spaced bus bars each bus bar being in electrical contact with the electrically conductive member; a second substrate overlaying and the electrically conductive member and bus bars; an interlayer positioned between the two substrates; a first leads connected to one of bus bars and a second lead connected to the other bus bar, each lead having an end extending beyond the periphery of the first substrate to provide external electrical access to the bus bars; an electrically non-conductive sleeve over selected portions of each of the lead; and air barriers along selected portions of the sleeve to prevent air from enter between the substrates.

24 Claims, 2 Drawing Sheets

U.S. PATENT DOCUMENTS

| | | | |
|---|---|---|---|
| 5,182,431 A | 1/1993 | Koontz et al. | 219/203 |
| 5,213,828 A | 5/1993 | Winter et al. | 428/46 |
| 5,240,886 A | 8/1993 | Gulotta et al. | 501/70 |
| 5,418,026 A | 5/1995 | Dronzek, Jr. et al. | 428/40 |
| 5,451,921 A * | 9/1995 | Crawford et al. | 338/220 |
| 5,466,911 A | 11/1995 | Spagnoli et al. | 219/203 |
| 5,492,750 A | 2/1996 | Shumaker, Jr. et al. | 428/192 |
| 5,523,162 A | 6/1996 | Franz et al. | 428/421 |
| 5,593,929 A | 1/1997 | Krumwiede et al. | 501/70 |
| 5,850,070 A | 12/1998 | Gillner et al. | 219/203 |
| 6,027,766 A | 2/2000 | Greenberg et al. | 427/226 |
| 6,535,126 B2 * | 3/2003 | Lin et al. | 340/550 |

* cited by examiner

EDGE SEALING OF A LAMINATED TRANSPARENCY

RELATED APPLICATION

The interlayer composite incorporating features of this invention is used in the practice of, and the practice of this invention uses the method of minimizing, if not eliminating hot spots at the end of bus bars disclosed in, U.S. patent application Ser. No. 10/201,864 filed even date in the name of Allen R. Hawk for "Eliminating Hot Spots at End Portions of Bus Bars of a Transparency Having an Electrically Conductive Member" which application is hereby incorporated by reference.

BACKGROUND OF THE INVENTION

1. Field of the Invention

This invention relates to a laminate having an internal member responsive to stimuli; to an interlayer composite to seal the edge portions of the laminate; optionally to bus bars arranged on the internal member to eliminate hot spots at end portions of the bus bars; to methods of fabricating the laminate using the interlayer composite, and optionally the arrangement of the bus bars, and, in particular, to a heatable transparent laminate, e.g. an automotive windshield having an interlayer composite having a lead assembly to prevent ingress of air into the laminate and to provide external electrical access to bus bars optionally arranged to eliminate hot spots at end portions of the bus bars, and to methods of making the heatable laminate.

2. Discussion of the Technology

Automotive heatable windshields, e.g. of the type disclosed in U.S. Pat. No. 4,820,902 include two glass sheets laminated together by a plastic interlayer, usually a sheet of polyvinyl butyral ("PVB"). A pair of spaced bus bars between the glass sheets are in electrical contact with an electrically conductive member, e.g. a sputtered electrically conductive coating of the type disclosed in European Patent Application No. 00939609.4, applied to a major surface of one of the glass sheets or a plurality of electrically conductive filaments of the type disclosed in U.S. Pat. No. 5,182,431. Each of the bus bars is electrically accessible by an external lead to pass current from a power source through the bus bars and the coating to electrically heat the coating and heat by conduction the inner and outer surfaces of the windshield. The heated windshield surfaces attain a temperature sufficient to remove fog, and melt snow and ice. As can be appreciated, heatable windshields are practical, and in some geographical areas are a requirement, during the winter season.

In the fabrication of commercially available automotive windshields, an electrically conductive coating, usually a sputtered electric conductive coating is applied to a flat piece of glass. The flat piece of glass is cut to provide a blank. A pair of spaced bus bars is provided on the coating by silk-screening an electrically conductive ceramic paste onto the conductive coating as discussed in U.S. Pat. Nos. 4,654,067 and 4,718,932 or by using metal foil bus bars as discussed in U.S. Pat. Nos. 5,418,026; 5,466,911, and 5,850,070. A second glass blank has a black band silk-screened onto the marginal edges. The black band shields the underlying adhesive securing the windshield to the automotive body from ultraviolet ("UV") radiation that can deteriorate the adhesive and provides an aesthetically pleasing appearance.

The coating and silk screened bus bars are normally applied to a surface of a blank that is designated as the No. 3 surface of the laminated windshield, i.e. the outer surface of the inner glass blank of the laminated windshield as mounted in the vehicle. The black band is normally applied to a surface of a blank that is designated as the No. 2 surface of the laminated windshield, i.e. the inner surface of the outer glass blank of the laminated windshield. The glass blank having the coating and the bus bars, and the glass blank having the black band are each shaped for a contoured windshield. A sheet of plastic interlayer, usually polyvinyl butyral is positioned between the shaped glass sheets (referred to as a "windshield subassembly"). When the bus bars are not silk screened on the coating, e.g. when metal foil bus bars are used, the bus bars are positioned between the interlayer and the coating.

The edges of the windshield subassembly are edge sealed in the usual manner, e.g. moving the windshield subassembly through nipper rolls or placing a vacuum channel around the periphery of the windshield subassembly and pulling a vacuum while heating the windshield subassembly. Thereafter the edge sealed windshield subassembly is placed in an air autoclave; heat and pressure are applied to the edge sealed subassembly to provide a laminated windshield. The seal around the periphery of the edge sealed windshield subassembly is formed to prevent air from moving between the glass sheets during the removal of the vacuum channel after the edge sealing operation and/or during the autoclaving.

For a general discussion regarding heatable windshields reference may be had to U.S. Pat. Nos. 3,789,191; 3,789,192; 3,790,752; 3,794,809; 4,543,466, and 5,213,828.

As can be appreciated, eliminating the silk screening of bus bars eliminates a manufacturing operation and all the limitations associated therewith such as the inventory of silk screens for each windshield design, handling and inventory of the ceramic conductive paste, and maintaining efficient operation of the silk-screening machines. Using metal foil bus bars eliminates the limitations associated with silk screening bus bars; however, there are other limitations in the use of metal foil bus bars. More particularly, the metal foil bus bars are in surface contact with the conductive coating. A lead, usually an extension of the bus bars, extends out of the laminate to provide electrical access to the bus bars. The surface of the lead that is a continuation of the surface of the bus bar in contact with the conductive coating and the adjacent portions of the glass sheet provide an air path. During the removal of the channel from, and/or during the autoclaving of, the edge sealed windshield subassembly air moves through the air path between the glass blanks. As can be appreciated by those skilled in the art of laminating windshields, the air moving between the blanks causes delamination. Depending on the severity of the delamination, the windshield may have to be discarded or replaced.

It would be advantageous therefore to use metal foil bus bars to eliminate the drawbacks of silk screening while eliminating the present drawbacks of metal foil bus bars.

SUMMARY OF THE INVENTION

This invention relates to an interlayer composite having a plastic sheet with a predetermined shape, a pair of spaced bus bars mounted on a major surface of the sheet, e.g. by a pressure sensitive adhesive and a lead assembly having an air barrier associated with each of the bus bars. The lead assemblies provide external electrical access to the bus bars and prevent air from moving around the leads during the laminating process (the edge sealing of the subassembly and autoclaving of the edged sealed subassembly). In one non-limiting embodiment, each of the bus bars and the lead associated therewith are a contiguous metal foil, e.g. a copper foil having a "T" shape. The bus bars, the first elongated or horizontal member of the "T", is secured on the major surface of the plastic sheet, and the leads, the second elongated or vertical member of the "T" extends away from the bus bars beyond the periphery of the sheet. In another non-limiting embodiment of the invention, a sleeve is provided over a portion of the lead to electrically isolate the lead and prevent damage to the sleeve from handling, e.g. a polyamide sleeve; a first air barrier is provided between inner walls of the sleeve and the surface portions of the lead in the sleeve, and a second air barrier, e.g. a thermo-set adhesive layer is provided on an outer surface portion of the sleeve to prevent air from moving over the outer surface portion of the sleeve during use of the composite in the laminating process.

The invention further relates to a heatable laminate such as an automotive transparency, e.g. an automotive windshield. The laminate in one non-limiting embodiment includes a first substrate, e.g. a first glass sheet, having a major surface and a periphery; an electric conductive member over a potion of the major surface of the first substrate; a pair of spaced bus bars, each bus bar having a major surface defined as a first surface and an opposite surface defined as a second surface, with the first surface in electrical surface contact with the electric conductive member. A second substrate, e.g. a second glass sheet, has a major surface, over and facing the electric conductive member and the second surface of the pair of bus bars. A plastic sheet having opposed major surfaces is between the second substrate and second surface of the pair of spaced bus bars. One of the major surfaces of the plastic sheet defined as the first surface of the plastic sheet is adhered to a portion of the conductive member and the second surface of the pair of bus bars, and the other major surface of the plastic sheet defined as the second surface of the plastic sheet is adhered to surface portions of the major surface of the second substrate. One of a pair of leads is connected to one of the pair of bus bars, and the other lead connected to the other one of the bus bars. Each of the leads has an end extending beyond the periphery of the first glass sheet to provide external electrical access to the bus bars. A sleeve is over a portion of each of the leads with an end portion of the sleeve between the glass sheets and the other end portion of the sleeve extending beyond the periphery of the first and second glass sheets, terminating short of the end of the lead outside the glass sheets. A first air barrier is provided between inner surface of the sleeve and the surface portion of the lead within the sleeve, and a second air barrier, e.g. an adhesive layer is between the outer surface portions of the sleeve and portions of the major surface of the first glass sheet.

In further non-limiting embodiments of the invention, the conductive member is a conductive coating applied to a surface of a sheet. The coating has a perimeter spaced from the edges of the sheet to provide the sheet with a non-conductive strip. Hot spots in the ends of the bus bar are minimized, if not eliminated by extending the end portions of the bus bars from the coating into the non-conductive strip. Additional non-limiting features of the invention to minimize if not eliminate hot spots at the end portions of bus bars include one or more of the following. (1) A pair of spaced bus bars having different lengths, one of the bus bar extends along the topside of the conductive coating and the other one of the bus bars extends along the bottom side of the conductive coating. The portions of the coating between the bus bars do not extend beyond the ends of the longer bus bar. (2) The windshield has a vision area having a top edge and a bottom edge; the coating has a top edge extending beyond the top edge of the vision area and a bottom edge extending below the bottom edge of the vision area. The bus bars are mounted on the coating and are outside of the vision area. The "vision area" is defined as the see through area of the windshield available to the driver and/or passenger. The top bus bars is adjacent the top edge of the coating and the bottom bus bar is adjacent the bottom edge of the coating. The bottom edge of the coating is spaced a greater distance from the bottom edge of the vision area than the bottom bus bar, and the top edge of the coating is spaced a greater distance from the top edge of the vision area than the top bus bar.

In other non-limiting embodiments of the invention, the interlayer composite described above may be used between the two substrates other than glass sheets, and the conductive member may be any member that is responsive to electric or heat stimuli, e.g. changes in transmittance as current is moved through the member.

The invention also relates to methods of making the laminates using the composite and optionally, the bus bar arrangement to minimize, if not eliminate, hot spots.

DETAILED DESCRIPTION OF THE INVENTION

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.3, and ending with a maximum value of 10 or less, e.g., 5.5 to 10. Also, as used herein, the terms "deposited over", "applied over", or "provided over" mean deposited, applied, or provided on but not necessarily in direct surface contact with. For example, a material "deposited over" a substrate does not preclude the presence of one or more other materials of the same or different composition located between the deposited material and the substrate.

In the following discussion, the invention will be described for use on vehicular laminated transparencies. As will be appreciated, the invention is not limited thereto, and may be practiced on any laminate that has an internal member responsive to stimuli and an interconnecting activating member, and leads to providing external access to the interconnecting activating member to stimulate the internal member. For example, but not limiting the invention thereto, the invention may be practiced on laminated windows for residential homes, commercial buildings and refrigerator doors having a viewing area. The internal member may be, but not limiting to the invention thereto, an electric conductive member that generates heat as current moves through the member, or a thermally or electrically sensitive coating that changes transmittance upon heating or application of current. The interconnecting activating member may be a pair of spaced bus bars between which current is passed through the internal member. Further and not limiting to the invention, the internal member may be an electric circuit to activate the windshield wipers, and the interconnecting activating member may be an electric lead connecting the sensor to a monitoring circuit. Types of conductive members that may be used in the practice of the invention, but not limiting the invention thereto are discussed in U.S. Pat. Nos. 4,401,609; 5,040,411 and 5,066,111; PCT Application U.S 02/06153 filed Feb. 28, 2002, for "Moisture Detection System and Method of Use Thereof"; U.S. patent application Ser. No. 09/738,306 filed Dec. 15, 2000, in the names of Chia Cheng Lin et al. for "Electrochromic Transparency Incorporating Security System", and U.S. patent application Ser. No. 09/591,572 filed Jun. 9, 2000, in the name of C. B. Greenberg for "Electrochromics", which documents are hereby incorporated by reference.

The vehicular transparence in the following discussion is an automotive windshield; however, the invention is not limited thereto and can be any type of a vehicular transparency such as, but not limiting the invention thereto, an automotive sidelight for example of the type disclosed in European Patent Application No 00936375.5 which document is hereby incorporated by reference, a moon roof and a backlite or rear window. Further, the transparency can be for any type of vehicle such as but not limiting the invention thereto land vehicles such as but not limiting the invention thereto trucks, cars, motorcycles, and/or trains, to air and/or space vehicles, and to above and/or below water vehicles.

Figure 1:
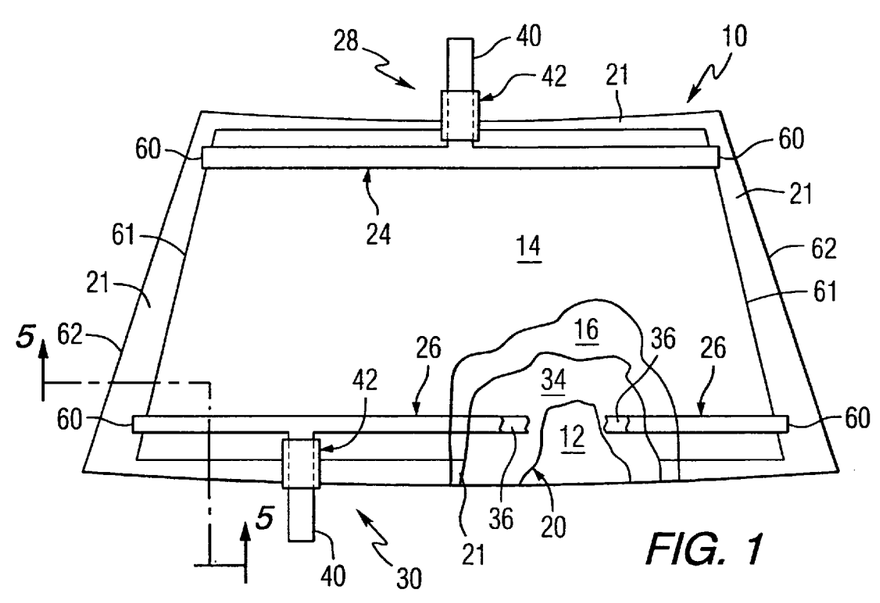
FIG. 1 is a plan view of a laminated automotive windshield incorporating features of the invention and having portions removed for purposes of clarity.

With reference to FIG. 1, there is shown an automotive windshield 10 incorporating features of the invention. The windshield 10 includes a pair of glass sheets or blanks 12 and 14, and an internal member 16 on inner surface of one of the glass sheets, e.g. outer surface of the inner sheet 14 also referred to as the No. 3 surface of the laminate or windshield assembly. In this discussion the internal member 16 is an electrically conductive member that is heated as current moves through the member to heat both the outer surfaces of the windshield 12 by conduction to remove fog, ice and/or snow, as the case may be. An interlayer composite 20 incorporating features of the invention laminates the glass sheets 12 and 14 together and provides facilities discussed below to move current between the sheets 12 and 14 and through the conductive member 16. Although the invention is not limited thereto, the electrically conductive member 16 is usually on or against the outer surface of the inner sheet as the windshield is mounted in the automobile.

As can be appreciated by those skilled in the art, the invention is not limited to the composition of the glass sheets 12 and 14, for example and not limited to the invention the glass sheets may be clear or tinted glass, for example, of the type disclosed in U.S. Pat. Nos. 5,030,592; 5,240,886, and 5,593,929 which patents are hereby incorporated by reference. The glass sheets can be annealed, tempered or heat strengthened. The glass sheets can have uniform thickness or can be wedged as viewed in cross section. The glass sheets can be soda-lime-silicate glass or borosilicate glass or any type of refractory glass. Further the invention is not limited to the electrically conductive member 16. The conductive member 16 may be a plurality of spaced conductive elements such as wires, e.g. as discussed in U.S. Pat. No. 5,182,431; or strips of conductive material, e.g. a plurality of discreet spaced areas of conductive coating, or a continuous conductive coating. In the practice of the invention and without limiting the invention thereto, the conductive member 16 is a coating having two metal films usually infrared reflecting films, e.g. silver, separated by dielectric layers, e.g. a film of an oxide of a tin zinc alloy and/or a zinc oxide film. The coating is of the typed disclosed in European Patent Application No. 00939609.4, which application is hereby incorporated by reference.

It is the normal practice, but not limiting to the invention, when using a sputtered type coating having multiple films to terminate the coating short of the edges of the glass sheet on which it is applied, e.g. short of the edges of the sheet 14 to provide uncoated marginal edge portions or non-conductive strip 21 between the perimeter of the conductive coating and the peripheral edge of the sheet 14 as shown in FIG. 1. This can be accomplished by coating the total surface of the sheet and deleting the coating e.g. as disclosed in U.S. Pat. No. 4,587,769 or using a mask during sputtering e.g. as disclosed in U.S. Pat. No. 5,492,750 to provide the non-conductive strip. The disclosures of U.S. Pat. Nos. 4,587,769 and 5,492,750 are hereby incorporated by reference.

Figure 2:
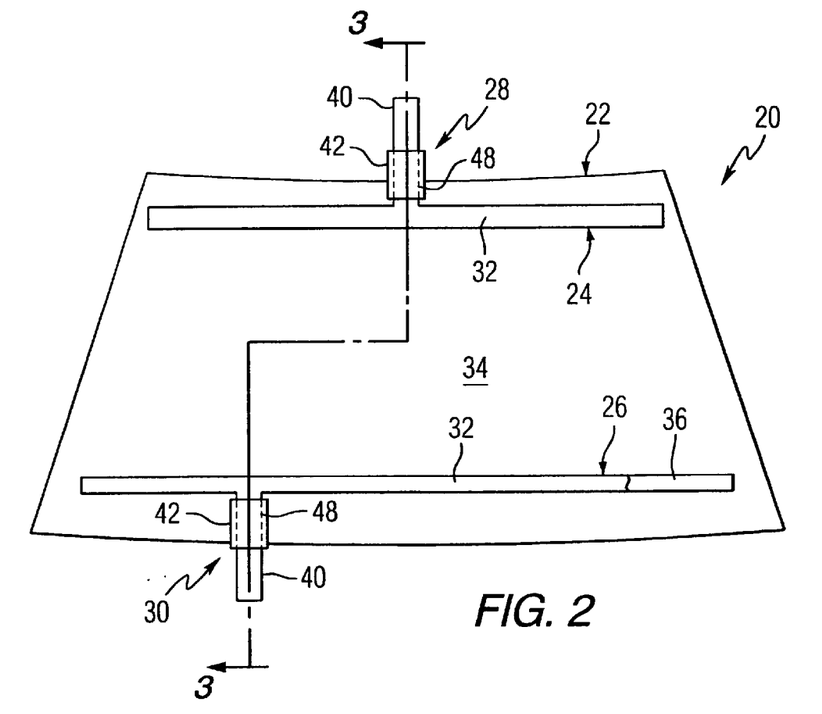
FIG. 2 is a plan view of an interlayer composite incorporating features of the invention and having portions removed for purposes of clarity.
Figure 3:
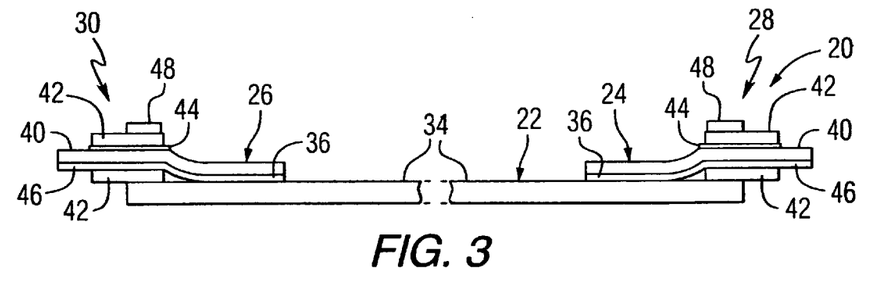
FIG. 3 is a view taken along sectional lines 3—3 of FIG. 2.
Figure 4:
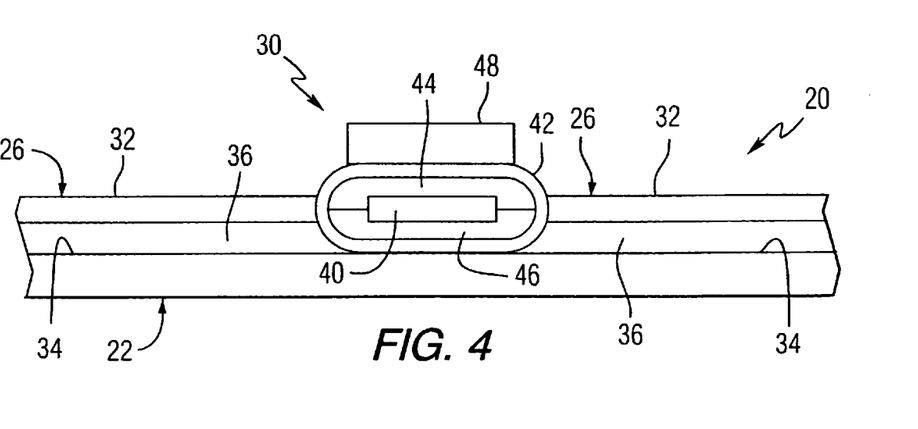
FIG. 4 is a side elevated view of the lead assembly shown along the lower edge of FIG. 2.

With reference to FIGS. 2–4 as needed, the discussion will be directed to the interlayer composite 20 incorporating features of the invention. For ease of discussion, and an appreciation of the elements and the cooperation of the elements of the interlayer composite 20, the interlayer composite shown in FIGS. 2–4 is prior to laminating the glass sheets and interlayer composite together as discussed below. The composite 20 includes a sheet of interlayer material 22, a pair of spaced bus bars 24, 26 adhered to the sheet 22 in any convenient manner and a lead assembly 28 and 30 associated with each of the bus bars 24 and 26, respectively.

The interlayer sheet 22 is not limiting to the invention and any of the types used in the laminating art to join two substrates, e.g. two transparent sheets such as glass sheets of an automotive transparency may be used in the practice of the invention. In the case of an automotive transparency the material of the interlayer sheet can be polyvinyl butyral ("PVB"), polyvinyl chloride ("PVC"), or polyurethane. The sheet 22 can have a uniform thickness though out its length and width or it can have varying thickness, e.g. as disclosed in U.S. Pat. No. 4,998,784, which patent is hereby incorporated by reference, to provide an interlayer in cross section having one or more wedged portions. The thickness, outer dimensions and configuration of the interlayer sheet 22 are not limiting to the invention; however in the practice of the invention it is preferred that the interlayer sheet 22 have dimensions and a configuration to laminate the glass sheets 12 and 14 together. Usually after lamination about ¹⁄₁₆ inch (0.16 centimeters ("cm")) of the interlayer extends beyond the peripheral edges of the glass sheets to insure a complete lamination of the surfaces of the glass sheets. The thickness of the sheet 22 is not limiting to the invention and should be of sufficient thickness to laminate the two sheets 12 and 14 together.

The bus bars 24 and 26 are made of metal foil 32, e.g. gold, silver, aluminum, or copper foil to name a few metal foils that may be used in the practice of the invention. In the practice of the invention, it is preferred to use copper foil because unlike gold and silver foils, it is inexpensive and unlike aluminum foil, it is non-reactive with most other current conducting materials. The width and thickness of the copper foil is not limiting to the invention; however it should be of sufficient thickness and width to carry the current required to heat the conductive member 16 to heat the outer surfaces of the windshield. The voltage and current usually carried by the bus bars to heat an automotive windshield is 42 volts and 31 amperes. In one non-limiting embodiment the thickness of the copper foil of the bus bars used was 2.8 mils. The width of the copper foil of the bus bar 24 having an electrical power feed located at the center of the bus bar was 7 millimeters, and the width of the copper foil of the bus bar 26 having an electrical power feed located at the side of the bus bar was 14 millimeters. A wider bus bar is preferred when using a side feed instead of a center feed to provide for an even current flow along the extended path of the bus bar. More particularly, the current moving through the right portion of the metal foil 32 of the bus bar 26 as viewed in FIG. 2 has to travel a longer distance and has more surface of the conductive member to pass current than the length of the bus bar 24 on each side of its respective lead. Therefore, the bus bar 26 should have a greater cross sectional area than the bus bar 24. Because a metal foil is used and because different thickness bus bars may cause laminating concerns, it is preferred, although not limiting to the invention to have bus bars of uniform thickness and increase the width of the bus bar to increase its cross sectional area. The length of the bus bars is not limiting to the invention and should be sufficient to extend across the surface of the conductive member 16. A more detailed discussion regarding the length of the bus bars is presented below.

With reference to FIGS. 2–4, the metal foil 32 of the bus bars is attached to surface 34 of the sheet 22 by a layer 36 of adhesive, e.g. an adhesive layer that has tacky surfaces at room temperature and adheres the sheet and foil together by biasing the sheet 22 and foil 32 together, i.e. a pressure sensitive adhesive. As can be appreciated, in place of a single layer of pressure sensitive adhesive, a double backed tape may be used, i.e. a tape having a layer of pressure sensitive adhesive on each side of a substrate. The material or type of adhesive of the layer 36 is not limiting to the invention and any type of adhesive. In selecting an adhesive material to mount the metal foil of the bus bars on the sheet 22, the adhesive material selected should be compatible with the material of the interlayer sheet 22 and the laminating process. More particularly, the adhesive should not chemically react with the material of the interlayer sheet, or any other material it comes into contact with, to produce by products such as gas that may result in delamination of the laminate. The adhesive material should also be compatible with the process, e.g. withstand the edge sealing temperature in the range of 200 to 275° F. (93.3 to 135° C.) and the autoclave-temperature in the range of 275 to 300° F. (134 to 148.8° C.). In the practice of the invention, a pressure sensitive adhesive of the types sold by 3M Corporation and Fralock Company of California were used.

With continued reference to FIGS. 2–4, and in particular to FIGS. 3 and 4, the lead assembly 28 and 30 provides external electrical access to the bus bars. Each of the lead assemblies includes an electrically conductive lead 40 connected to one of the bus bars 24 or 26, and each lead 40 has a protective sleeve 42 adhered thereto by an adhesive layer to prevent air from moving through the sleeve and between the glass sheets after edge sealing and during autoclaving. For ease of discussion and not limiting to the invention, the adhesive layers are shown and discussed as adhesive layers 44 and 46. The material of the lead, physical thickness and configuration is not limiting to the invention. The lead provides a path to move current from a power supply, e.g. a car battery (not shown) to its respective bus bar. For an automotive transparency it is expected that the lead will carry 42 volts and 32 amps. Although not limiting to the invention and as shown in FIGS. 1 and 2, the lead 40 is an extension of its respective bus bar, i.e. the lead is contiguous with its respective bus bar. The bus bars and leads may be considered to have a "T" shaped configuration with the bus bar or horizontal member or first elongated member of the "T" adhered to surface 34 of the interlayer sheet 22. The lead or vertical member or second elongated member of the "T" extends outwardly from its respective bus bar beyond the edges of the laminate.

The protective sleeve 42 protects the lead 40 against mechanical damage resulting from bending the lead about the edges of the glass sheets 12 and 14 of the laminate during handling and shipping of the laminates, and electrically insulates a portion of the lead, e.g. exposing only that portion of the lead need to make electrical contact with the connector to connect the lead to the power supply (not shown). The protective sleeve has one end portion between the sheets 12 and 14, and the other end extending beyond the laminate and terminating short of the end of its respective lead as shown in FIG. 2. The protective sleeve can be made of any material that electrically insulates the lead and prevents damage to the lead, and is compatible with the material of the interlayer sheet 22, and the edge sealing and autoclaving processes. In one nonlimiting embodiment of the invention, the material of the protective sleeve was a polyamide of the type sold by Dupont Chemical Company under its trademark KAPTON. The polyamide material selected for its electrically insulating and mechanical properties maintains its structural stability at the edge sealing and autoclave temperatures, but is not viscid those temperatures. In those instances when the material of the protective sleeve is not viscid or does not become viscid at the sealing and autoclaving temperatures, it is necessary to prevent air from moving around the sleeve and between the sheets after edge sealing, and during autoclaving.

In accordance to the invention, an air barrier is provided to prevent air from moving between and through the protective sleeve, and an air barrier is provided to prevent air from moving around the protective sleeve and thereafter between the glass sheets, i.e. prevent the ingress of air between the sheets. The layer 46 as viewed in FIGS. 3–5 and the adjacent inner surface of the protective sleeve blocks the air path to prevent the ingress of air between the bottom surface of the lead 40 and adjacent inner surface of the sleeve. The layer 46 can be provided by extending the adhesive layer 36 along the bottom surface of the lead 40 beyond the end of the protective sleeve as shown in FIGS.

3 and 4. There is no air path between the bottom surface of the bus bar and the interlayer because of the adhesive layer 36 eliminates or blocks the ingress of air. There is no air path or ingress of air between the outer surface of the sleeve 42 and the glass sheet 12 because the interlayer sheet 22 flows around the outer surface portion of the sleeve during edge sealing.

Figure 5:
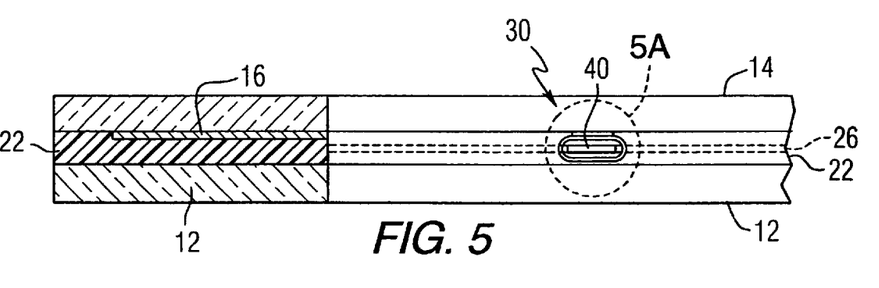
FIG. 5 is a view taken along sectional lines 5—5 of FIG. 1 having an exploded frontal view of the lead assembly incorporating features of the invention.
Figure 5A:
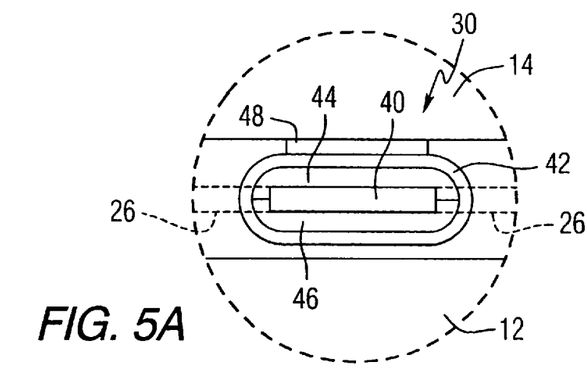

The air path between the upper surface of the lead and the adjacent inner surface of the protective sleeve 42 as viewed in FIGS. 3–5 is between the upper surface of the bus bar and the glass sheet and continues between the bus bars and the conductive coating. The air path or ingress of air between the upper surface of the lead 40 and the adjacent inner surface of the protective sleeve 42 is blocked by providing a layer 44 of adhesive between the upper surface of the lead and adjacent inner surface of the sleeve. The adhesive layer 44 may be similar to the adhesive of the layer 36 or 46, or may be pieces of PVB, PVC or polyurethane. The air path or ingress of air between the upper outer surface of the protective sleeve 42 and the glass sheet 14, and between the upper surface of the bus bar and the non-conductive strip 21 of the glass sheet 14 and coating 16 on the glass sheet 14 is blocked by an adhesive layer 48 (see FIGS. 3–5) between the upper surface of the protective sleeve and adjacent surface of the sheet 14. It is preferred that the layer 48 be a non-tacky material at the temperatures at which the two glass sheets 12, 14 and interlayer composite 20 are assembled prior to the edge sealing operation so that the interlayer composite and glass sheets may be easily moved relative to one another to properly position the bus bars on the conductive coating. Further, the adhesive should be compatible with the materials of the interlayer and the protective sleeve to prevent the formation of chemical by-products such as gas. Any adhesive that does not deteriorate at the edge sealing and autoclaving temperatures to the extent that it does not prevent the ingress of air, and is compatible with the materials of the laminate, may be used in the practice of the invention. Types of adhesives that may be used for the layer 48 include but are not limiting to thermo-set adhesives, polyvinyl butyral, rubber cement, acrylic adhesives and pressure sensitive adhesives.

In the discussion of the invention, the layers 44, 46 and 48 were discussed as adhesive layers; however, the invention is not limited thereto and any material that reduces or prevents ingress of air between the sheets 12 and 14 may be used in the practice of the invention. For example, compressible material held in place by friction may be used. The amount of air prevented from flowing around and through the protective sleeve is not limiting to the invention, and the amount of airflow restricted should be that amount to prevent damage to the laminate, e.g. by delamination. In the case of an automotive laminate of the type discussed above, it is preferred, but not limiting to the invention, to maintain the laminate substantially free of air to prevent subsequent delamination of portions the windshield. The structural strength of the layers 44, 46 and 48 that make up the air barriers should be sufficient to withstand the pressure forcing air through and around the protective sleeve after edge sealing and autoclaving.

In the FIGS., especially in FIGS. 3–5, the physical dimensions, e.g. thickness of the elements or components are not to scale in order that an appreciation of the relationship of the components to one another can be had. The physical dimensions used to make a windshield incorporating features of the invention have or will be discussed.

As can be appreciated, the exit location of the lead assemblies 28 and 30 from the laminate is not limiting to the invention. For example, both lead assemblies 28 and 30 can exit from the same side of the windshield as disclosed in U.S. Pat. No. 5,213,828, which disclosure is hereby incorporated by reference; the lead assemblies can exit from opposite sides as shown in FIG. 1; the lead assemblies can each exit from the same location on their respective side of the laminate or from different locations on their respective side of the laminate as shown in FIG. 1.

In the practice of the invention, the edge sealing of the windshield subassembly (the interlayer composite 20 positioned between the glass sheets prior to edge sealing) is enhanced by the practice of the invention. More particularly, after edge sealing, the ingress of air between the glass sheets is prevented by the adhesive layers 44 and 46 provided between the inner surface of the protective sleeve and the lead 40, and the adhesive layer 48 on the upper surface of the protective sleeve as shown in FIGS. 3–5.

In one experiment (the First Experiment), ten (10) pieces of copper foil having a pressure sensitive adhesive on one surface were mounted on a PVB sheet having a generally trapezoidal shape. The pieces of copper foil were each 3.5 mils (0.089 millimeters (mm)) thick, 8 to 10 inches (20.32 to 25.4 cm,) long (the length was not actually measured) and ½ inch (13 mm) wide. Two pieces were positioned completely within the perimeter of the PVB sheet, and eight (8) pieces had a portion positioned on the PVB sheet and had 1 inch (2.54 cm) extend beyond the perimeter of the PVB sheet. A piece of Kapton polyamide having a layer of pressure sensitive adhesive on one surface was adhered to each side of the portion of the foil extending beyond the perimeter of the PVB sheet. The pieces were 1 inch (2.54 cm) in length, 6 mils (15 mm) wide and 3 mils (0.08 mm) thick. One-half inch (1.27 cm) of each of the eight pieces extended out from the PVB sheet. Six (6) of the pieces (nos. 1–6) partially on the PVB sheet were spaced along one short side, e.g. the right side of the PVB sheet as viewed in FIG. 1, and one piece (no. 7) was placed at the right side completely within the perimeter of the sheet. One piece (no. 8) extended out of the center of one long side, e.g. the bottom side of the PVB sheet; one piece (no. 9) extended out of the center of the top side of the PVB sheet and one piece (no. 10) was completely within the perimeter of the PVB sheet adjacent the top side of the PVB sheet as shown in FIG. 1. No. 3 and 4 pieces had rubber cement on the outer surface of both polyamide pieces within the perimeter of the PVB; No. 5 and 6 pieces had a layer of acrylic pressure sensitive adhesive one the outer face of both polyamide pieces. Nos. 1, 2 and 7–10 did not have adhesive on the outer surface of the polyamide pieces. The PVB sheet having the pieces of foil was placed between two glass sheets with the sleeve halfway between the glass sheets and the remaining half out of the glass sheets. A vacuum channel was placed around the edges of the subassembly and a vacuum was pulled for 5 minutes at room temperature after which the laminate with the vacuum applied was heated in an oven at a temperature set at 250° F. (212° C.) for 12 minutes; the subassembly attained a temperature 225° F. (107° C.). After edge sealing, the laminate was autoclaved. After autoclaving, portions of the PVB sheet that extended out from between the glass sheets around the sleeve were pushed inwardly around the sleeve. The laminate was tested for air bubbles within the laminate by boiling the laminate for 2 hours in water heated to 212° F. (100° C.). The pieces of foil within the laminate were viewed by the unaided eye to observe the presence of bubbles around the pieces of foil.

The No. 1, 2, 8 and 9 pieces that did not have any sealant between the outer surface of the polyamide pieces and the glass sheets and PVB sheet had air bubbles along the edges of the copper foil. The No. 3 and 4 pieces that had rubber cement, and the No. 5 and 6 pieces that had acrylic adhesive, on the outer surfaces of the polyamide pieces had no air bubbles along the edges of the copper foil. The No. 7 and 10 pieces within the perimeter of the glass sheets had no bubbles around the edges of the copper foil. The First Experiment demonstrated that providing an adhesive, e.g. rubber cement or acrylic around the outer surfaces of the polyamide pieces prevented the ingress of air between the glass sheets during the laminating process.

A Second Experiment was conducted to determine if the PVB, a thermo-set adhesive, would adhere to the polyamide to prevent ingress of air between the glass sheets. In the Second Experiment, 10 pieces of copper foil similar in size to the copper foil pieces of the First Experiment were mounted using pressure sensitive adhesive on a PVB sheet in the following arrangement. The No. 11–16 pieces were placed in positions similar to the No. 1–5 and 7 pieces with the end portions of the No. 11–15 pieces extending beyond the perimeter of the sheet, and the No. 16 piece within the perimeter of the sheet. The No. 17 piece was placed at the center portion of the top edge of the sheet with an end potion extending beyond the edge, similar to the No. 9 piece. The No. 18 piece was placed at the center portion of the bottom edge of the sheet as viewed in FIG. 1 with an end portion extending beyond the bottom edge of the sheet, similar to No. 8 piece. The No. 19 piece was placed at the upper left corner of the sheet with an end portion extending beyond the top edge of the sheet, similar to the No. 17 piece. The No. 20 piece was placed at the bottom left corner of the sheet with an end portion extending beyond the bottom edge of the sheet, similar to the No. 18 piece. Pieces of polyamide were placed on the portions of the pieces extending beyond the edge of the PVB sheet as discussed in the First Experiment. The surface of the polyamide piece facing away from the PVB sheet had either rubber cement or acrylic adhesive applied to the surface. The PVB sheet was placed between two glass sheets and laminated; thereafter the laminated was boiled tested. The laminating and boil test procedures were similar those practiced in the First Experiment.

The boiled laminate was viewed with the unaided eye. No bubbles were observed around the copper foil within the glass sheets; however, air bubbles were observed around the polyamide pieces. It was and is believed that the PVB did not attain the heat softening temperature during the edge sealing operation, i.e. the subassembly needed more soak time.

A Third Experiment was conducted to test three types of adhesives discussed below. In the Third Experiment, 16 pieces of copper foil similar in size as the pieces of the First Experiment were mounted on the PVB sheet with pressure sensitive adhesive in the following arrangement. Four (4) pieces spaced from one another were positioned along each edge of the PVB sheet with a portion of each piece extending beyond the edge of the PVB sheet. Each of the pieces had polyamide pieces around portion of the foil pieces at the edge of the PVB sheet as discussed in the First Experiment. The surface of the polyamide piece facing away from the PVB sheet was coated with one of three adhesives. One adhesive was liquid paper glue sold by Stockwell Office Products under the mark Glue stick; the other adhesive was contact cement sold by Avery Dennison, under the mark GLUEPEN, and the third adhesive was contact cement sold by Avery Dennison under the mark Glue Stic. The adhesives were applied in a liquid state and were allowed to dry before the PVB sheet was placed between two glass sheets. The subassembly was laminated and boil tested as in the First Experiment.

The laminate was viewed with the unaided eye, and a few very minor air bubbles were observed around the pieces of copper foil. Although the presence of even minor amounts of air bubbles are of concern for automotive windshields and other laminated automotive transparencies, there can be applications where laminates are used and a few minor bubbles can be managed.

As can now be appreciated, the above-discussed embodiments of the invention are not limited to the position of the bus bars on the conductive member or the relationship of the ends of the bus bars to the perimeter of the coating. It is however, preferred in the practice of the invention to use the relationship of the ends of the bus bar to the perimeter of the coating to minimize, if not eliminate hot spots at the end potions of the bus bar as disclosed in U.S. patent application Ser. No. 10/201,864 filed even date. "Hot spots" as the term is used herein are areas of the bus bar that are at a temperature higher than the adjacent portions of the bus bar as a result of more current moving through the area than through the adjacent portions of the bus bar.

With reference to FIG. 1, and as disclosed in the application Ser. No. 10/201,864 filed even date, the top bus bar 24, the bottom bus bar 26 and the non-conductive strip or uncoated area 21 have a relationship to minimize, if not eliminate hot spots at the end portions of the bus bars. Although not limiting to the invention, the parameters of interest in this non-limiting embodiment of the invention include (1) the position of the ends of the bus bar relative to the perimeter of the conductive member, (2) the spacing between the bus bars and (3) the change in the horizontal distance between the sides of the conductive member between the bus bars.

Regarding the position of the ends of the bus bar relative to the perimeter of the conductive member, as shown in FIG. 1 end portions 60 of the top bus bar 24 and the bottom bus bar 26 extend beyond perimeter 61 of the conductive member 16 into the non-conductive strip 21, with the ends of the bus bars preferably terminating short of the periphery 62 of the sheet 14. Through observations of IR photographs, it has been concluded that with the ends of the bus bars terminating short of the perimeter of the conductive coating while maintaining the remaining parameters constant, hot spots are observed at the end of the bus bar. As the distance between the end of the bus bar and the perimeter 61 of the coating 16 increases, the hot spots increase in size and temperature and vice versa.

Extending the ends of the bus bars into the non-conductive strip 21 while keeping the remaining parameters constant reduces the temperature and/or area of the hot spots when compared to ends of the bus bars that terminate short of the perimeter of the coating. It is believed that the hot spots result from more current moving through the end portions of the bus bar to heat the surrounding area of the conductive member between the end portions of the bus bar and the perimeter of the coating. Based on the forgoing, it is expected that perfect alignment of the ends of the bus bar with the perimeter of the conductive coating while maintaining the other parameters constant, will reduce the current distribution at the end portions of the bus bars when compared to ends of the bus bar that terminate short of the perimeter of the coating.

Although it is expected that hot spots are minimized with perfect alignment of the ends of the bus bars with the perimeter of the conductive member, because of the difficulty in a production environment of continuously aligning the ends of the bus bars with the perimeter of the conductive coating, it is preferred in the practice of the invention to have the ends of the bus bars extend into the non-conductive strip 21. The length of the end portions 60 of the bus bars 24, 26 extending into the non-conductive strip 21 is not limiting to the invention. As long as the ends of the bus bars extend beyond the perimeter of the coating, the temperature and area of the hot spots decrease as compared to hot spots at the end portions of the bus bars terminating short of the perimeter of the conductive member. In the practice of the invention, it is preferred to have the ends of the bus bars terminate short of the peripheral edge 62 of the laminate 10 to avoid shorting of the bus bar when the windshield is mounted in the opening of the automotive body.

Consider now the spacing between the bus bars 24 and 26. With continued reference to FIG. 1, the upper and lower edges of the glass sheet 14 and of the windshield 10 usually have a radius. The upper edge of the sheets 12 and 14 has a smaller radius and length than the bottom edge of the sheets 12 and 14, which is the normal configuration of sheets used in the fabrication of windshields. The perimeter configuration of the conductive coating usually has the same or similar peripheral configuration as the sheets to heat the vision area of the windshield. With the bus bar 24 generally following the shape of the top edge of the conducive coating, and the bus bar 26 generally following the shape of the bottom edge of the conductive coating as viewed in FIG. 1, the length of the bottom bus bar is greater than the length of the upper bus bar. As the difference in length between the bus bars increases, the area of conductive coating to be heated by the bottom bus bar increases. The result of this differential is the end portions of the bottom bus bar on the coating 16 carrying more current to heat more area of the conductive coating 16, which contributes to temperature increases at the end portions of the bottom bus bar.

One solution to the problem is to provide a conductive member with a rectangular shape. However, since the windshield does not have a rectangular shape, a significantly large portion at the bottom of the windshield (where the snow and ice usually accumulate) would not be heated. In the practice of the invention, the solution to this problem is to reduce the space between the bus bars. For example and not limiting to the invention, the bus bar 24 is spaced from the top edge of the conductive coating 16, and the bottom bus bar 24 is spaced from the bottom edge of the conductive member to decrease the area of the conductive member between the bus bars. In other words, the distance between the bus bars is reduced. In this manner the difference in the area to be heated by the top bus bar and the bottom bus bar is reduced. The invention is not limited to the distance between the bus bar and the adjacent side of the conductive coating; however in the practice of the invention it is preferred to keep the bus bars out of the vision area of the windshield.

Consider now the change in the distance between the vertical sides or edges of the coating 16 between the bus bars 24 and 26. In the practice of the invention, it is preferred that no portion of the vertical edges of the conductive member as viewed in FIG. 1 between the bus bars extend beyond one or both ends of the longer bus bar. As viewed in FIG. 1, no portion of the coating 16 between the bus bars extends beyond the bottom bus bar 26, the longer of the two bus bars. Although not limiting to the invention, the distance between the vertical edges of the conductive member increases as the distance from the bottom bus bar decreases. Portions of the conductive member between the bus bars that extend beyond the an end of the longer bus bar will result in the bus bar having to heat more area of the conductive coating.

In the practice of the invention, a sputtered infrared reflecting coating was deposited onto the surface of a flat piece of glass. A mask was positioned on the glass piece to provide an uncoated marginal edge portion, the non-conductive strip 21, after the glass sheet is cut from the glass piece. Since the process of sputtering and the sputtered coating is not limiting to the invention and are well known in the art, the sputtering process and coating will not be discussed. The coating 16 terminated 16 millimeters from the peripheral edge of the sheet to provide the uncoated area 21 shown in FIG. 1. The coating had a generally trapezoidal shape with the width of the coating generally increasing moving from the top edge to the bottom edge of the coating as shown in FIG. 1. A black band of ceramic paste was silk screened on the marginal edges (not shown) of the sheet 12 to provide UV protection for the underlying adhesive securing the windshield in position in the automotive body. The sheet 14 having the conductive coating 16 and the sheet 12 having the black band on the marginal edge were shaped and annealed. Since the process of shaping and annealing of sheets for automotive windshields is well known in the art and is not limiting to the invention, the procedures will not be discussed.

With reference to FIGS. 3 and 4, an interlayer composite 20 incorporating features of the invention had a PVB sheet 30 mils (0.76 mm) thick and a surface area and configuration to overlay and cover the surface of the sheet 12. The bus bars had a length sufficient to extend across the conductive coating and 0.25 inch (6 mm) into the non-conductive strip 21 of the sheet 14. The top bus bar, i.e. bus bar 24, and its respective lead 40 were contiguous with another and were a copper foil having a thickness of 2.8 mils (0.07 mm). The top bus bar was 27 mils (7 mm) wide and its associated lead was 54 mils (14 mm) wide with the lead exiting the center portion of the sheet 22 as shown in FIGS. 1 and 2. The bottom bus bar 26 and its respective lead 40 were contiguous with one another and were a copper foil having a thickness of 2.8 mils (0.07 mm). The bottom bus bar and it associated lead were 54 mils (14 mm) wide with the lead exiting the left side portion of the sheet 22 as shown in FIGS. 1 and 2. Each of the leads had sufficient length to extend 1 to 1-½ inches (2.54 to 3.81 centimeters) from the edge of the windshield. The copper foil was secured on the sheet 22 by a pressure sensitive adhesive having a thickness of 1 mil (0.0254 mm) and a width similar to the width of its associated metal foil. The pressure sensitive adhesive was of the type sold 3M. The pressure sensitive adhesive extended along the surface portion of the lead 40 extending beyond the sheet and is designated by the numeral 46 in FIGS. 3–5. The bus bars were generally parallel to one another and spaced 36.5 inches (92.7 cm).

Two pieces of Kapton polyamide each having a thickness of 0.5 mils (0.013 mm) and a width and length of 0.79 inch (20 mm) provided the protective sleeve 42. One piece of the polyamide was place around the bottom of each lead 40 and held in position by the adhesive layer 46. A polyamide piece was secured on the top of each lead by providing a layer 44 of a pressure sensitive adhesive similar to the adhesive of the layer 46. One-half (½) inch (1.27 cm) of the polyamide was within the edge of the sheet 22. A layer 48 of a thermo set adhesive No. 1500B100 (R/FLEX) supplied by Roger Corporation of Connecticut was purchased from Fralock Company of California was applied to the outer surface of the protective sleeves 28 and 30 as shown in FIGS. 3 and 4. The thermo set adhesive had a thickness of 1 mil (0.25 mm) and a width and length to cover the portion of the sleeve to be positioned between the glass sheets.

The interlayer composite was positioned on the shaped sheet 14 with the bus bars in electrical contact with the coating 16. The shaped sheet 12 was placed over the composite 20. A vacuum ring of the type used in the manufacture of laminated windshields was positioned over the periphery of the assembly (the interlayer composite 20 positioned between the sheets 12 and 14 as discussed above) and vacuum of 20–28 inches of mercury was pulled. The windshield subassembly having the vacuum applied was place in an oven set at 260° F. (126.7° C.) for 15 minutes to heat the subassembly to a temperature of about 225° F. (127.2° C.). While the windshield subassembly was in the oven, the vacuum was continuously pulled through the channel to pull air from between the blanks. The heat and vacuum sealed the marginal edges of the windshield subassembly. Thereafter the edge sealed windshield subassembly was placed in an air autoclave and laminated.

As can be appreciated by those skilled in the art of laminating, the edge sealing of the subassembly and laminating of the edge sealed subassembly is not limiting to the invention. For example, the subassembly may be sealed using nipper rollers or bagging the subassembly, and the edge sealed subassembly may be laminated by oil autoclaving.

Providing the air barriers of the invention between the inner surface of the protective sleeve and the surfaces of the lead, and between the outer surface of the protective sleeve, e.g. the upper outer surface of the protective sleeve and the surface of the sheet 14, prevents the ingress of air between the sheets 12 and 14 and between the surfaces of the conductive coating and the adjacent surfaces of the bus bars after edge sealing and during autoclaving.

As can be appreciated, the outer surface of the windshield may be provided with a coating to keep the surface clean such as the type disclosed in U.S. Pat. No. 6,027,766, or a hydrophobic coating of the type sold by PPG Industries, Inc. under the trademark Aquapel and disclosed in U.S. Pat. No. 5,523,162, which patents are hereby incorporated by reference.

The particular embodiments described in detail herein are illustrative only and are not limiting to the scope of the invention, which is to be given the full breadth of the appended claims and any and all equivalents thereof.

What is claimed is:

1. A heatable laminate comprising:
   a first substrate having a major surface and a periphery;
   an electrically conductive member on a portion of the major surface of the first substrate;
   a pair of spaced bus bars each bus bar having a major surface defined as a first surface and an opposite surface defined as a second surface, the first surface of each bus bar in electrical contact with the electrically conductive member;
   a second substrate having a major surface, with the major surface of the second substrate over and facing the electrically conductive member and the second surface of the pair of bus bars;
   a plastic sheet having opposed major surfaces between the major surface of the second substrate and the second surface of the pair of bus bars, one of the major surfaces of the plastic sheet defined as the first surface adhered to a portion of the conductive member and the second surface of the pair of bus bars and the other major surface of the plastic sheet defined as the second surface of the sheet adhered to surface portions of the major surface of the second substrate;
   a pair of electrically conductive leads, one of the leads connected to one of the pair of bus bars and the other lead connected to the other one of the bus bars and each lead having an end extending beyond the periphery of the first substrate to provide external electrical access to the bus bars;
   an electrically non-conductive sleeve over a portion of each of the leads, an end portion of the sleeve between the substrates and the other end portion extending beyond periphery of the first and second substrate and terminating short of end of the lead outside the substrates;
   a first air barrier between inner surface of the sleeve and the surface portion of the lead within the sleeve, and
   a second air barrier between selected outer surface portions of the sleeve and adjacent marginal edge portions of the first substrate.

2. The heatable laminate according to claim 1, wherein each of the bus bars are contiguous with its respective lead and surface of the bus bar and lead facing the conductive member is defined as the first surface of the bus bar and the lead, and the opposite surface of the bus bar and the lead are defined as the second surface of the bus bar and the lead with selected portions of each of the second surface of the bus bars secured to the first surface of the plastic sheet by an adhesive.

3. The heatable laminate according to claim 2, wherein the bus bars and respective lead are made of a metal foil and the adhesive on selected portions of the second surface of the bus bar is on the portion of the lead extending through the protective sleeve and is adhered to the adjacent inner surface of the protective sleeve to provide a portion of the first air barrier.

4. The heatable laminate according to claim 3, wherein the heatable laminate is an automotive transparence, the first and second substrates are glass sheets, the metal foil is a copper foil and the adhesive securing potions of the second surface of the bus bars is a pressure sensitive adhesive.

5. The automotive transparence according to claim 4 wherein the transparence is an automotive windshield.

6. The heatable laminate according to claim 1, wherein the electrically conductive member is an electrically conductive coating, the coating defined by a perimeter with the perimeter of the coating spaced from the periphery of the first substrate, and end portion of at least one bus bar extending beyond the perimeter of the coating.

7. The heatable laminate according to claim 6, wherein the heatable laminate is an automotive transparency, the first and second substrates are glass sheets, the coating has at least one conductive film between a pair of dielectric films.

8. The automotive transparency according to claim 7, wherein the area between the perimeter of the coating and the periphery of the first glass sheet is defined as a non-conductive strip and each end portion of each one of the bus bars extends into the non-conductive strip.

9. The automotive transparency according to claim 8, wherein ends of the bus bar terminate short of the periphery of the first sheet.

10. The automotive transparency according to claim 8, wherein the bus bars have different lengths and coating has a top side, a bottom side, a right side and a left side with one of the bus bar extending along the top side and the other one of the bus bars extending along the bottom side and portions of the coating between the bus bars does not extend beyond the ends of the longest bus bar.

11. The automotive transparency according to claim 7, wherein at least one of the major surfaces of the transparency includes a hydrophobic coating.

12. The automotive transparency according to claim 7, wherein at least one of the major surfaces of the transparency includes a photocatalytic coating.

13. The heatable laminate according to claim 1, wherein the adhesive layer on the outer surface potion adjacent the first substrate is a thermo-set adhesive.

14. The heatable laminate according to claim 13, wherein the second barrier is a thermo-set adhesive that is non-tacky at temperatures at or below temperature at which surface of the plastic sheet becomes viscid.

15. The heatable laminate according to claim 1, wherein the plastic sheet is selected from the group consisting of polyvinyl butyral, polyvinyl chloride, polyethylene and combinations thereof.

16. The heatable laminate according to claim 3, wherein at least one of the glass sheets or the plastic sheet has a portion in cross section having a wedged shape.

17. The heatable laminate according to claim 1, wherein the material of the second air barrier is selected from the group consisting of polyvinyl butyral, polyvinyl chloride, polyethylene and combinations thereof.

18. The heatable laminate according to claim 1, wherein the first air barrier includes the inner surfaces of the sleeve adhered by an adhesive to portions of the surfaces of the lead within the sleeve.

19. The heatable laminate according to claim 1, wherein the laminate is a transparency for a vehicle selected from the group consisting of land, air, space above water, below water and combinations thereof.

20. The heatable laminate according to claim 19, wherein the laminate is a transparency for a land vehicle and the land vehicle is an automobile with the transparency selected from the group consisting of windshield, side window, rear window roof window and combinations thereof.

21. The heatable laminate according to claim 6, wherein the transparency is a windshield having a vision area having a top edge and a bottom edge and the coating having a top edge adjacent the top edge of the vision area and a bottom edge adjacent the bottom edge of the vision area with one of the bus bars adjacent the top edge of the coating and the other bus bar adjacent the bottom edge of the coating wherein the bottom edge of the coating spaced a greater distance from the bottom edge of the vision area than the bus bar adjacent the bottom edge of the coating and the top edge of the coating spaced a greater distance from the top edge of the vision area than the bus bar adjacent the top edge of the coating.

22. A laminate comprising:
a first substrate having a major surface and a periphery;
an electrically conductive member responsive to electric stimuli over a potion of the major surface of the first substrate;
a pair of spaced interconnecting activating members, each activating member having a major surface defined as a first surface and an opposite surface defined as a second surface, the first surface in electrical surface contact with the electrically conductive member;
a second substrate having a major surface, with the major surface over and facing the electrically conductive member and the second surface of the pair of activating members;
a plastic sheet between the first and second substrates and second surface of the pair of spaced activating members, the plastic sheet having opposed major surfaces with one of the major surfaces of the plastic sheet defined as the first surface and the opposite surface defined as the second surface wherein the first surface of the plastic sheet is adhered to a portion of the conductive member and the second surface of the pair of activating members and the second surface of the plastic sheet adhered to surface portions of the major surface of the second substrate;
a pair of electrical conductive leads, one of the leads connected to one of the pair of activating members and the other lead connected to the other one of the activating members and each lead having an end extending beyond the periphery of the first substrate to provide external electrical access to the activating members;
a sleeve over a portion of each of the leads, an end portion of the sleeve between the substrates and the other end portion extending beyond the periphery of the first and second substrate and terminating short of the end of the lead outside the substrates;
a first barrier between inner surface of the sleeve and the surface portion of the lead within the sleeve, and
a second air barrier between outer surface portions of the sleeve adjacent the first substrate between the first substrate and the portions of the first substrate.

23. The laminate according to claim 22 wherein the activating members are bus bars.

24. The laminate according to claim 22 wherein the laminate is selected from the group consisting of residential windows, commercial windows, land vehicular windows, space vehicular windows, air vehicular windows, water vehicular windows, widows for doors of refrigerators and combinations thereof.

* * * * *